(12) United States Patent
Bean et al.

(10) Patent No.: US 7,476,429 B2
(45) Date of Patent: Jan. 13, 2009

(54) BRIDGE LABEL FOR SPLICING TAPE

(75) Inventors: Jason A. Bean, Saco, ME (US); Koichi Nakamura, Buffalo Grove, IL (US)

(73) Assignees: Permacel, North Brunswick, NJ (US); Nitto Denko Corporation, Osaka (JP)

( * ) Notice: Subject to any disclaimer, the term of this patent is extended or adjusted under 35 U.S.C. 154(b) by 0 days.

(21) Appl. No.: 10/842,691

(22) Filed: May 11, 2004

(65) Prior Publication Data
US 2005/0095385 A1    May 5, 2005

Related U.S. Application Data

(60) Provisional application No. 60/516,312, filed on Nov. 3, 2003.

(51) Int. Cl.
*B31F 5/06*     (2006.01)
*B32B 9/00*    (2006.01)
*B65H 19/18*  (2006.01)

(52) U.S. Cl. .................. 428/40.1; 156/157; 242/160.1; 242/556; 242/556.1; 428/41.7; 428/42.1; 428/194; 428/343; 428/354

(58) Field of Classification Search ................ 428/40.1, 428/41.7, 42.1, 343, 354, 194, 57, 58; 242/556, 242/556.1, 160.1; 156/157
See application file for complete search history.

(56) References Cited

U.S. PATENT DOCUMENTS

| | | |
|---|---|---|
| 1,996,497 A | 4/1935 | Wood |
| 2,089,469 A | 8/1937 | Dix |
| 2,149,832 A | 3/1939 | Bernard |
| 2,149,833 A | 3/1939 | Bernard |
| 2,172,776 A | 9/1939 | Scott |
| 2,320,657 A | 6/1943 | Rosen |
| 2,377,971 A | 6/1945 | Roesen |
| 2,812,145 A | 11/1957 | Meloche |
| 2,920,835 A | 1/1960 | Gibson |
| 3,231,949 A | 2/1966 | Phipps |
| 3,243,337 A | 3/1966 | Haselow et al. |

(Continued)

FOREIGN PATENT DOCUMENTS

CA    2025473 A1    3/1991

(Continued)

OTHER PUBLICATIONS

Supplementary European Search Report.

*Primary Examiner*—Victor S Chang
(74) *Attorney, Agent, or Firm*—Sughrue Mion, PLLC

(57) ABSTRACT

A bridge label including two adhesive portions, the adhesive portions defining a first face of the bridge label; and a non-adhesive portion extending between the two adhesive portions, the non-adhesive portion also defining the first face of the bridge label. A splicing system including the bridge label in combination with a top sheet of a new roll, and a splicing tape provided across the top sheet of the roll. A second face of the bridge label, which opposes the first face, is affixed to an exposed adhesive portion of the splicing tape. The adhesive portions of the bridge label affix the first face of the bridge label to an expiring web. A splicing method including affixing the bridge label to a splicing tape that is adhered to the roll.

22 Claims, 8 Drawing Sheets

U.S. PATENT DOCUMENTS

| | | |
|---|---|---|
| 3,503,568 A | 3/1970 | Galley |
| 3,547,739 A | 12/1970 | Beute |
| 3,767,039 A | 10/1973 | Schroter |
| 3,915,399 A | 10/1975 | Kron |
| 4,564,150 A | 1/1986 | Keene et al. |
| 4,575,017 A | 3/1986 | Pali |
| 4,704,315 A | 11/1987 | McClintock |
| 4,905,924 A | 3/1990 | Moore |
| 5,212,002 A | 5/1993 | Madzrak et al. |
| 5,275,344 A | 1/1994 | Ray |
| 5,277,731 A | 1/1994 | Krimsky et al. |
| 5,301,891 A | 4/1994 | Dugay |
| 5,318,656 A | 6/1994 | Dylla et al. |
| 5,323,981 A | 6/1994 | Dionne |
| 5,332,607 A | 7/1994 | Nakamura et al. |
| 5,348,793 A | 9/1994 | Stettner |
| 5,356,496 A | 10/1994 | Lincoln et al. |
| 5,397,076 A | 3/1995 | Padilla |
| 5,692,699 A | 12/1997 | Weirauch et al. |
| 5,916,651 A | 6/1999 | Wienberg et al. |
| 5,996,927 A | 12/1999 | Weirauch et al. |
| 6,416,604 B1 | 7/2002 | Nootbaar et al. |
| 6,432,241 B1 | 8/2002 | Congard et al. |
| 6,488,228 B2 | 12/2002 | Davies et al. |
| 2002/0056784 A1 | 5/2002 | Davies et al. |
| 2004/0045658 A1 | 3/2004 | Bean et al. |
| 2005/0208252 A1* | 9/2005 | Hannington et al. ....... 428/40.1 |

FOREIGN PATENT DOCUMENTS

| | | |
|---|---|---|
| DE | 38 34 334 A1 | 4/1990 |
| EP | 0 555 772 A1 | 8/1993 |
| EP | 0 574 869 A2 | 12/1993 |
| EP | 1 223 133 A1 | 7/2002 |
| GB | 1 504 286 | 3/1978 |
| GB | 2 079 628 A | 1/1982 |
| GB | 2 257 931 A | 1/1993 |
| WO | WO 90/08032 A1 | 7/1990 |
| WO | 93/04968 | 3/1993 |
| WO | WO 94/25381 A1 | 11/1994 |
| WO | WO 95/05989 A1 | 3/1995 |
| WO | 02/092713 A1 | 11/2002 |

* cited by examiner

BRIDGE LABEL FOR SPLICING TAPE

This application claims the benefit of U.S. Provisional Application No. 60/516,312 filed Nov. 3, 2003, the disclosure of which is incorporated herein by reference.

FIELD OF THE INVENTION

This invention generally relates to a bridge label for use with a splicing tape.

BACKGROUND OF THE INVENTION

A splicing tape can be used, for example, as a flying splice for splicing a new roll of paper to an expiring, running sheet or web of a depleting roll of paper. The splicing tape is first attached to the top sheet of a new roll. Then, the new roll is accelerated to the speed of the running web using, for example, a belt drive. Finally, the splicing tape on the new roll is brought into contact with the expiring web. When the splicing tape is brought into contact with the expiring web, the new roll adheres to the expiring web causing the new roll to be spliced to the expiring web. U.S. application Ser. No. 10/274,268, which is incorporated herein by reference, discloses an example of such a splicing tape.

FIGS. 1a and 1b each show a belt drive 350 having a belt 351 used to accelerate a new roll of paper or other material 210 in the direction of arrow "A". This technique is employed, for example, in the commercial printing and newspaper markets. The belt drive 350 is lowered onto the new roll 210 so that the belt 351 contacts with the new roll 210 at a corresponding belt contact area 260. When the belt drive 350 is operated to rotate the belt 351 while in contact with the new roll, the new roll 210 rotates.

As shown in FIG. 1a, the new roll 210 includes a splicing tape 140 laid across the new roll along an axial direction X of the new roll. Since the splicing tape is laid over a part of the contact area 260, the belt 351 will contact the splicing tape 140 when it is lowered to drive the new roll. However, allowing the belt 351 to contact the splicing tape 140 can cause significant problems. One such problem occurs when the splicing tape 140 is attached, as shown in FIG. 1a, to both the top sheet 211 of the new roll 210 and to the sheet 212 underlying the top sheet 211.

As shown in FIG. 1a, the splicing tape 140 can be an "all in one" type that has adhesive on both sides, such as that described in U.S. application Ser. No. 10/274,268. Alternatively, as shown in FIG. 1b, the splicing tape 140' can be a single sided, adhesive coated tape fixed on underlying sheet 212 with tab tapes 140a that are broken when the splicing tape 140' is contacted on expiring web 220. Either arrangement allows the new roll 210 to splice with an expiring web sheet. However, since the splicing tape 140 (140') is typically placed along the width of the new roll 210 (i.e., parallel to the axis X), the belt 351 of the belt drive 350 will contact or roll over a portion 141 of the splicing tape 140 (140') that is positioned along the belt contact area 260 of the new roll 210. When the belt 351 rolls over the splicing tape 140 (140'), the adhesive of the splicing tape 140 (140') tacks onto or adheres to the belt 351, causing the splicing tape 140 (140') to prematurely release from the underlying sheet 212. Premature release of the splicing tape 140 (140'), or a portion of the splicing tape, can have a detrimental effect on the proper splicing of the new roll 210 to the expiring web sheet. In particular, the premature release of the splicing tape 140 (140'), or a portion of the splicing tape, can cause the top sheet 211 of the new roll 210 to be moved from the proper position for splicing with the expiring web.

Bridge labels have been used to overcome this problem. A bridge label is typically a die cut tab that is applied on top of a splicing tape at the portion of the splicing tape that would otherwise contact the belt of the belt drive. When properly applied, the bridge label will have an exposed lower tack surface with a lower adhesive strength than that of the splicing tape so as to provide some tack to the expiring web when the new roll is spliced to the expiring sheet without causing the splicing tape to release from the underlying sheet. If the bridge label did not have any exposed adhesive, the splice between the new roll and the expiring web at the position of the bridge label would pucker. This pucker could cause the splice to fail.

FIGS. 2a and 2b show a conventional bridge label 100 having an adhesive layer 120 and a non-adhesive (i.e., non-tacky) layer 130 provided on top of the adhesive layer 120. The non-adhesive layer 130 has ¼ inch diameter holes 126 that are spaced at intervals of ½ inch. As a result of this configuration, adhesive dots 122 from the adhesive layer 120 extend through the holes 126 to provide some adhesiveness, adhering the bridge label 100 to the expiring web when the new roll is spliced to the expiring sheet. On the other hand, the adhesiveness of the bridge label 100 is not strong enough to cause the bridge label 100 to adhere to the belt 351 so that the splicing tape 140 does not prematurely release from the underlying sheet 212.

U.S. Pat. No. 6,488,228, which is fully incorporated herein by reference, discloses another method of preventing the splicing tape from adhering to the belt drive. In accordance with this patent, a portion of the release liner is maintained on the splicing tape at a position corresponding to where the belt drive contacts the new roll. In accordance with this method, the bridge label does not have any exposed adhesive and the splice between the new roll and the expiring web may pucker at the position of the bridge label as explained above.

Referring to FIG. 3, aspects of a printing operation on a spliced web 200 will be described with respect to the splicing tape 140 of FIG. 1a. As shown in FIG. 3, the spliced web 200 includes the expiring web sheet 220, the end of the top sheet 211 of the new roll 210, and the splicing tape 140 and bridge label 100 that splice the top sheet 211 to the expiring web sheet 220. During the printing operation, the spliced web 200 is sent through a dryer to dry the inks on the web and burn off the ink solvents. As the spliced web 200 is moved forward in the direction of arrow "B," high temperature (e.g., 350-400 degrees Fahrenheit) air 500 is directed toward the spliced web 200 to dry the ink.

However, when a conventional bridge label 100 is sent through the dryer, the bridge label 100 acts as an air dam since the splice portion at the bridge label is thicker than the remaining splice. The air dam causes the air 500 that builds up at the bridge label to become so hot that the adhesive of the bridge label 100 melts. As schematically illustrated in FIG. 4, this problem is further exacerbated in the case of the conventional bridge label 100 of FIGS. 2a and 2b. When this bridge label is sent through the dryer, the adhesive dots 122, which extend through the holes 126 of the non-adhesive layer 130 and which are adhered to the expiring web 220, further obstruct the flow of air 500 and raise the temperature of the hot air 500 that has entered the space between the bridge label 100 and the expiring web 220.

Furthermore, since the adhesion of the bridge label 100 to the expiring web 220 is lower than that of the splicing tape 140 due to a reduced contact area, it is easy for the bridge label 100 to be peeled off of the expiring web 220 by the force from the flow of air 500. In fact, if one of the adhesive dots 122 of the conventional bridge label 100 is peeled off the expiring web 220, it becomes more likely that an adjacent dot 122 will also be peeled off since the stress that is holding the paper is thereafter concentrated on the remaining dots 122. Eventually, all of the adhesive dots 122 are likely to be peeled off the expiring web 220. The resulting lack of adhesion along this portion of the splice causes the splice 140 to pucker and break in a manner similar to when a bridge label without exposed adhesive is used.

In short, the bridge label has the dual functions of preventing the splice from adhering to the belt of belt drive, while also providing adequate adhesion between a new roll and expiring web. However, conventional bridge labels have not adequately performed these two competing functions well.

SUMMARY OF THE INVENTION

The present invention is directed to preventing these problems and to improving the splicing of an expiring running web to a new roll of paper.

It is, therefore, an object of the present invention to provide a bridge label that prevents the splice from breaking by preventing the belt of a belt drive from contacting the splicing tape.

It is another object of the present invention to provide a bridge label that has exposed adhesive in order to ensure an uninterrupted splice along the width of the web, while also preventing the splice from breaking due to the high temperature air used to dry the ink.

In one aspect of the invention, a bridge label includes two adhesive portions, the adhesive portions defining part of a first face of the bridge label; and a non-adhesive portion extending between the two adhesive portions, the non-adhesive portion defining another part the first face of the bridge label.

According to another aspect of the invention, a splicing system includes the bridge label above in combination with a top sheet of a new roll, and a splicing tape provided across the top sheet of the roll. A second face of the bridge label, which opposes the first face, is affixed to an exposed adhesive portion of the splicing tape. The adhesive portions of the bridge label affix the first face of the bridge label to an expiring web.

According to still another aspect of the invention, a splicing method includes affixing the above bridge label to a splicing tape that is adhered to the roll.

BRIEF DESCRIPTION OF THE DRAWINGS

The advantages, nature and various additional features of the invention will appear more fully upon consideration of the illustrative embodiment of the invention which is schematically set forth in the accompanying drawings.

FIG. 2b shows a sectional view of the conventional bridge label of FIG. 2a;

DETAILED DESCRIPTION OF THE PREFERRED EMBODIMENTS

Figure 1A:
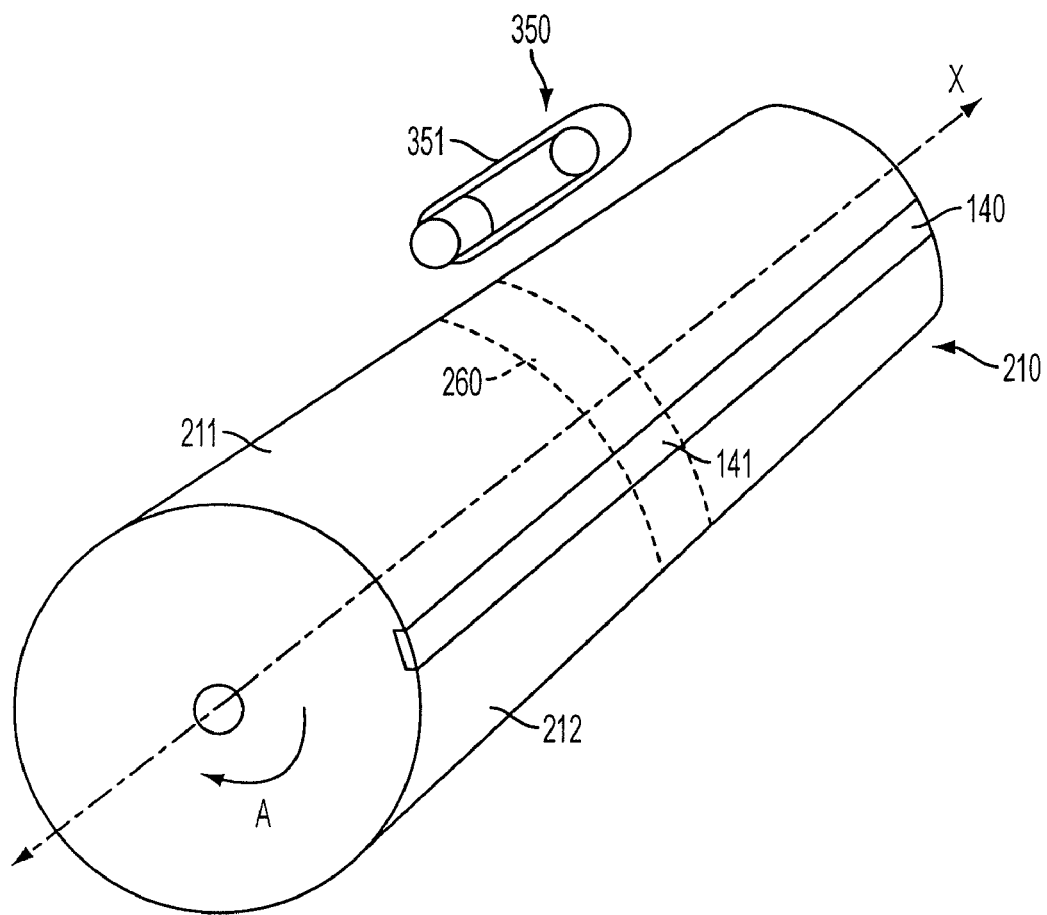
FIGS. 1a and 1b show a perspective views of new rolls having a splicing tape and a bridge label.
Figure 1B:
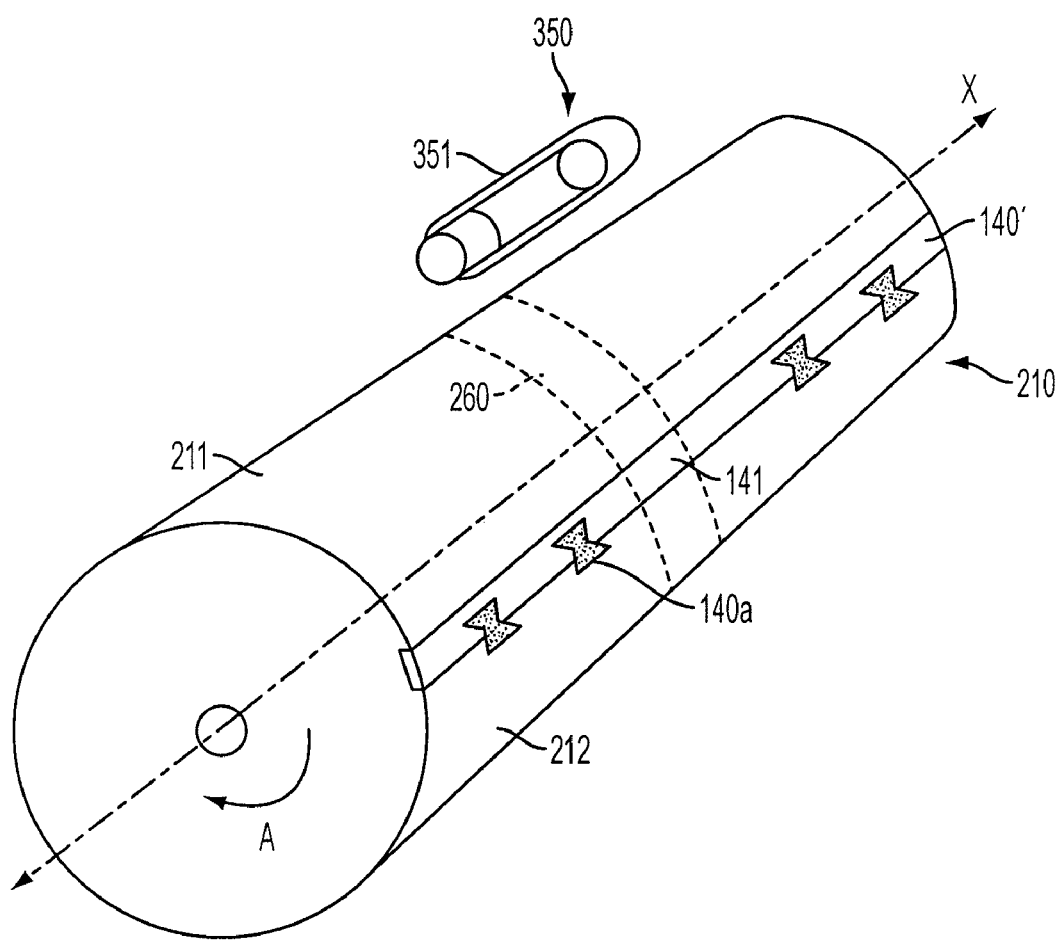
Figure 2A:
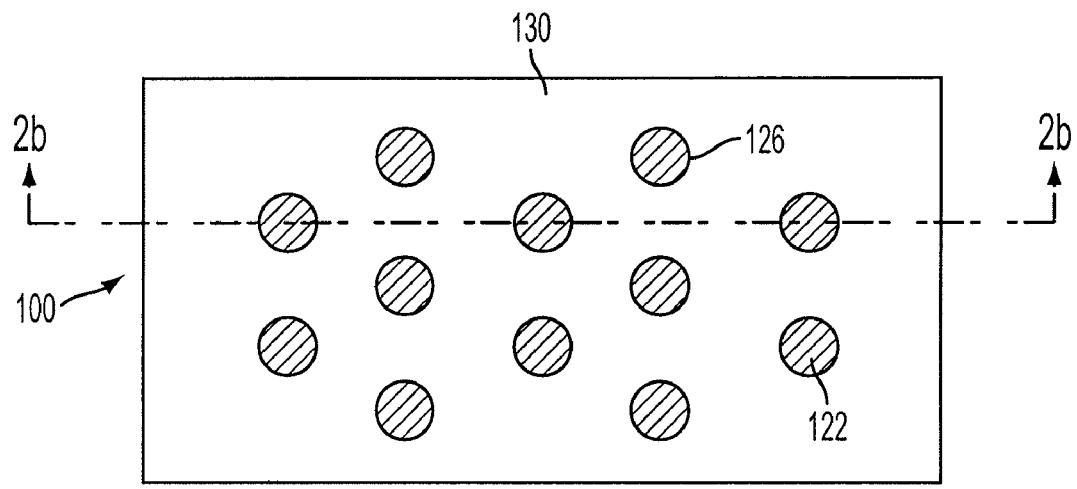
FIG. 2a shows a top view of a conventional bridge label with holes in the non-adhesive layer.
Figure 2B:
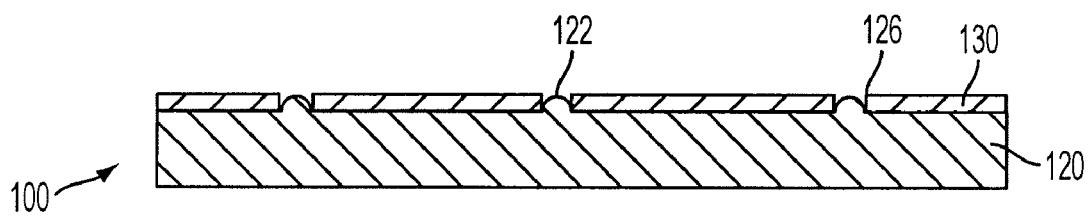
Figure 3:
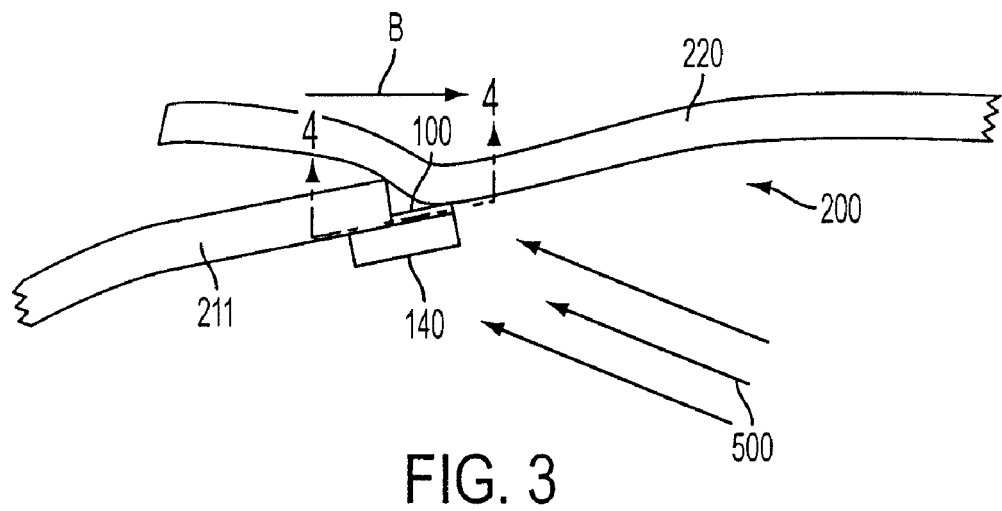
FIG. 3 shows a side view of the conventional bridge label applied to a splicing tape.
Figure 4:
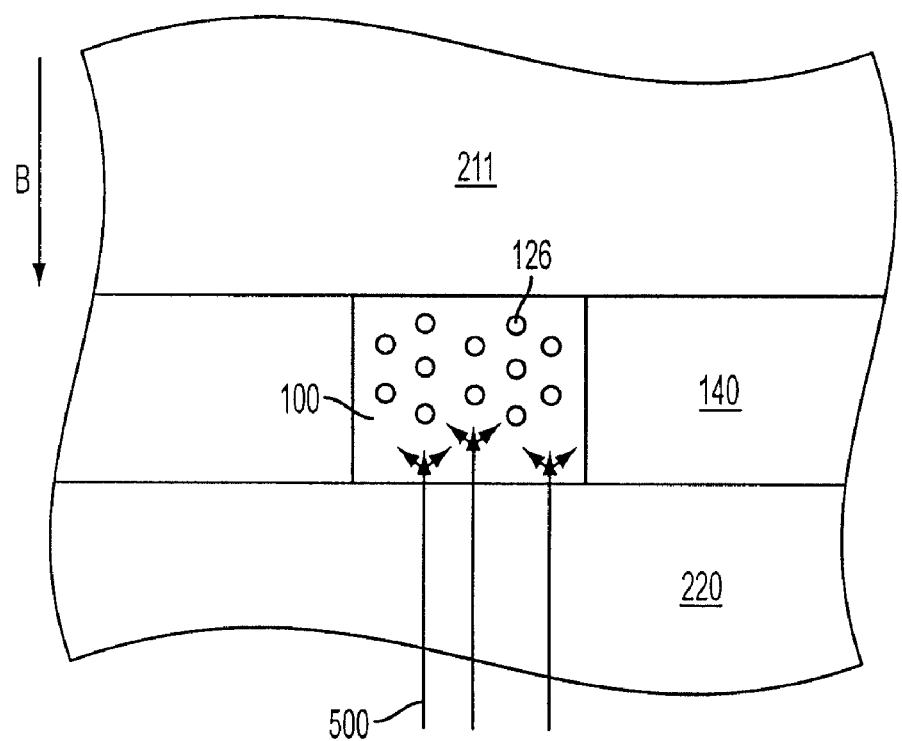
FIG. 4 shows a sectional view of the conventional bridge label of FIG. 3 obstructing the flow of air.

While the invention is open to various modifications and alternative forms, specific embodiments thereof are shown by way of examples in the drawings and are described herein in detail. There is no intent to limit the invention to the particular forms disclosed.

Figure 5A:
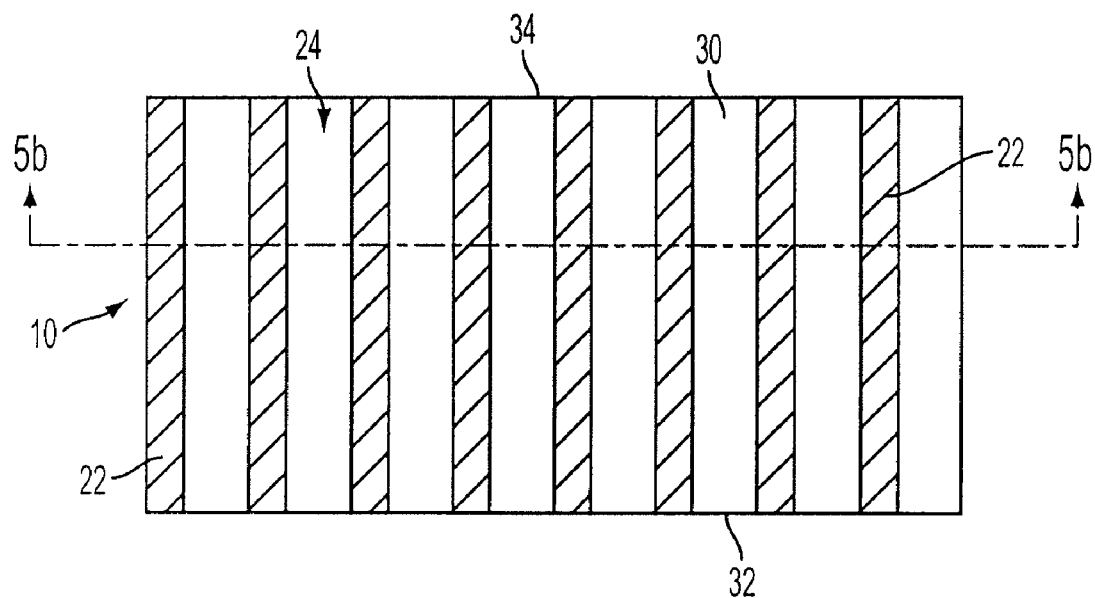
FIG. 5a shows a top view of a first embodiment of the bridge label of the invention.

FIG. 5a shows a top view of a first embodiment of a bridge label 10 in accordance with the present invention. The bridge label has a first face (or side) 24 defined by adhesive (i.e., tacky) portions, and non-adhesive (i.e., non-tacky) portions extending between the adhesive portions. The adhesive portions are preferably elongated portions, i.e., they having notably more length than width or are slender portions. The first face 24 of the bridge label is adapted to be spliced to a web, as is discussed in detail below.

According to the first embodiment, the non-adhesive portions are non-adhesive strips 30 that define open spaces between adhesive portions 22 of an adhesive layer 20.

Figure 5B:
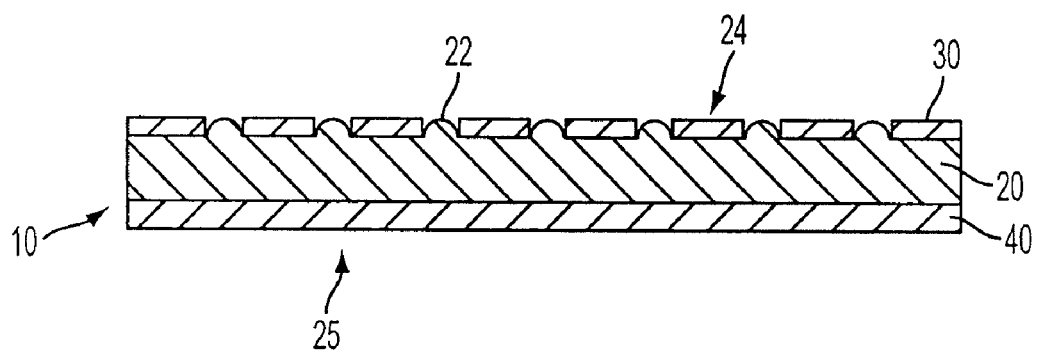
FIG. 5b shows a sectional side view of the first embodiment of the bridge label.

In addition, as shown in the sectional view of FIG. 5b, a release liner, or a base material, 40 that easily adheres to the splicing tape, may be applied to a bottom of the adhesive layer 20. The bottom of the bridge label 10 is a second face 25 of the bridge label 10 that opposes the first face 24.

As shown in FIGS. 5a and 5b, the non-adhesive strips 30 extend substantially across the bridge label 10 from one end (e.g., a front end 32) of the bridge label 10 to another end (e.g., a back end 34) of the bridge label 10. The remaining exposed adhesive portions 22 between adjacent non-adhesive strips 30, which also extend from the front 32 to the back 34 of the bridge label, are able to be affixed to a sheet, such as the running/expiring web sheet 220. The non-adhesive strips 30, together with the opposing surface of the running/expiring web, define conduits or openings that allow high temperature air 500 to pass through the bridge label 10 when a spliced web moves within a dryer, such as an air flotation dryer.

In a variation of the above embodiment, the non-adhesive strips 30 can be detackified portions of the adhesive layer 20 rather than non-adhesive layers. If the non-adhesive strips 30 are non-adhesive layers, however, then the exposed adhesive portions 22 extend between the non-adhesive strips 30 in order to affix the bridge label to the running/expiring web. Furthermore, the non-adhesive layer 30 can be made of paper, such as coated or uncoated paper or film, but the invention is not limited in this respect.

The adhesive layer 20 is preferably a transfer adhesive tape which does not contain a backing or double coated adhesive tape with a backing inside, but the invention is not limited in this respect.

Figure 6:
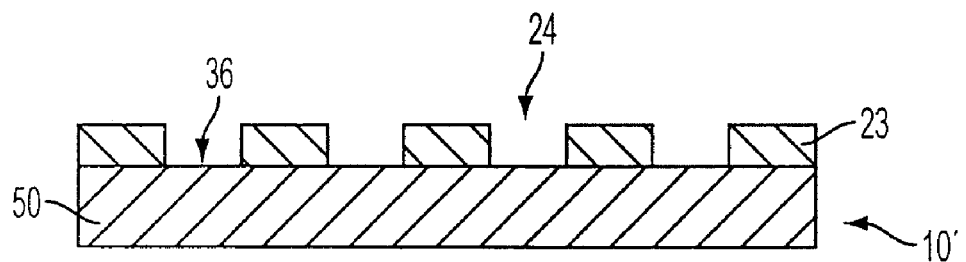
FIG. 6 shows a sectional view of a second embodiment of the bridge label of the invention.

FIG. 6 shows a second embodiment of the invention in which the bridge label 10' includes adhesive strips 23, as the adhesive portions of the first face 24, and a non-adhesive backing layer 50, as the non-adhesive portion of the first face 24. The adhesive strips 23 are positioned at intervals on the top of the non-adhesive backing layer 50. The backing layer 50 is preferably made of paper, film, or a non-woven material, but the invention is not limited in this respect.

The adhesive strips 23 are configured to be affixed to the running/expiring web, while uncovered portions 36 of the non-adhesive backing layer 50 that are not provided with adhesive strips 23 define conduits to allow high temperature air 500 to pass through the bridge label 10' when a spliced web using this bridge label moves within a dryer.

Figure 8:
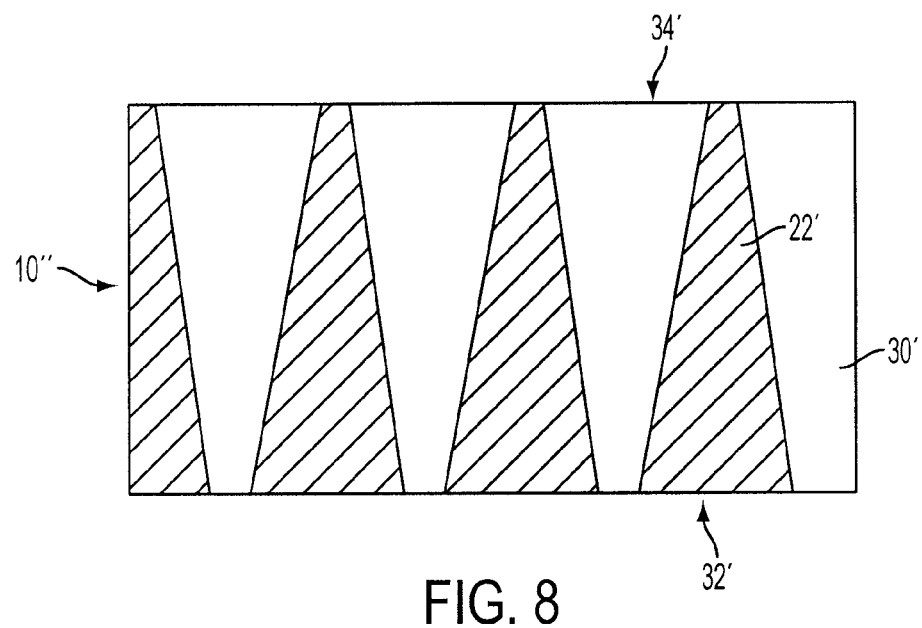
FIG. 8 shows a top view of a third embodiment of the bridge label of the invention.

Preferably, the non-adhesive strips 30 (FIG. 5a) or the uncovered portions 36 of the non-adhesive backing 50 (FIG. 6) are formed having a substantially constant width along their entire lengths. However, the invention is not limited to this configuration. For example, FIG. 8 illustrates a variation of the first embodiment in which non-adhesive strips 30' of the bridge label 10" can have a substantially trapezoidal or "V" shape, with the non-adhesive strips 30' having a narrower width at one end, such as the front end 32' of the bridge label and a wider opening at the back end 34' of the bridge label. Again, the resulting exposed adhesive 22' extends between the non-adhesive strips 30' in order to allow the bridge label 10' to be affixed to the running/expiring web. Likewise, in a variation of the second embodiment, the adhesive strips 23 can have a substantially trapezoidal or "V" shape.

Furthermore, other shapes can be used. However, it is preferable that the conduits or channels in the bridge label extend from the front end of the bridge label to the back end of the bridge label, allowing air to be directed across the non-adhesive portions without creating excessive turbulent air flow.

Preferably the adhesive of the adhesive layer 20 or adhesive strips 23 have a lower tack, but a higher shear adhesive property, than the splicing tape 140. For example, the adhesive of the adhesive layer 20 can be a R9401, which is produced by Nitto Americas, Inc. However, the invention is not limited in this respect and other materials can be used.

Additionally, the adhesive layer 20 or adhesive strips 23 can be either double coated adhesive tape which has a backing inside of the adhesive layer or transfer adhesive tape which does not contain a backing inside. As noted above, the non-adhesive strips 30 can be paper, such as coated or uncoated paper or film, or a detackified adhesive by printing. However, again, the invention is not limited in this respect and other materials can be used.

The non-adhesive strips 30 or uncovered portions 36 are preferably ½ to 1½ inches wide and spaced at 1/10 to 1 inch intervals, but the invention is not limited in this respect.

Furthermore, as discussed in detail below, the bridge labels can be provided in roll form by being cut, in the case of the first embodiment, from a roll of adhesive 20 with the non-tacky strips 30 already attached.

Because the belt 351 of the belt drive 350 (and, therefore, the belt contact area 260 of the new roll 210) is typically 2 to 3 inches wide, the length $L_B$ (see FIG. 11) of the bridge label 10 is generally 3 to 5 inches so that it is large enough to prevent the belt from contacting the underlying splicing tape 140. That is, the length $L_B$ of the bridge label 10 is sized so that the bridge label 10 will be able to cover the exposed portion 141 of the splicing tape 140 that would otherwise contact the belt 351. In the preferred embodiment, the width $W_B$ (see FIG. 11) of the individual bridge label is the same as width of splicing tape 140. It is preferred, therefore, that the width $W_B$ of the bridge label 10 covers 100% of the exposed area 141 of the splicing tape 140, and the length $L_B$ of the bridge label 10 is at least 125% of the width of the belt 350a, as shown in FIG. 11.

Although the invention is not limited by specific sizes or dimensions, it is preferred that the adhesive layer 20 and non-adhesive strips 30 (or the backing 50 and adhesive strips 23 in the case of the second embodiment) are very thin. In particular, the adhesive layer 20 can be about 50 to 200 microns thick, and the non-adhesive strips 30 can be 50 to 150 microns thick paper or 12 to 100 micron thick film.

Several methods of producing the bridge label 10 are described below.

Figure 11:
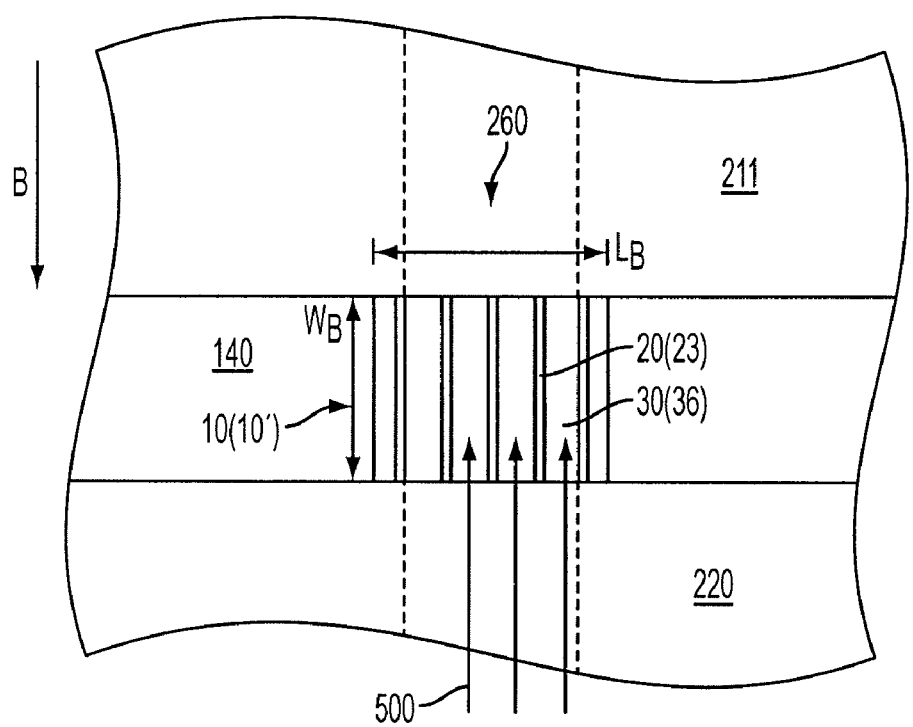
FIG. 11 shows a sectional view of the bridge label of FIG. 10.

For example, one method of making the first embodiment shown in FIGS. 5a and 5b involves first providing a roll of double coated adhesive tape (as a non-limiting embodiment of the adhesive layer 20) with release liner 40, which have a width of $L_B$ (shown in FIG. 11).

Next, the roll is unwound and several non-adhesive layer strips of paper or film (i.e., non-limiting examples of non-adhesive strips 30) are laminated on the adhesive layer 20. Then the adhesive layer 20, and non-adhesive layer strips 30 are cut to a length of $W_B$ (shown in FIG. 11) with a die. It is preferred that the release liner 40 is not cut at this time, but is instead rewound with the two cut layers (i.e. the non-adhesive layer strips 30 and adhesive layer 20). Since the release is not cut, multiple bridge labels are provided lined on release liner 40. Thereafter, when bridge labels 10 are used, they are peeled one by one from release liner 40.

Instead of laminating non-adhesive layer strips, as is discussed above, detackified strips can be provided on the adhesive layer 20. One manner of providing detackified strips is by coating ink on the adhesive 20 and then drying the ink before the roll is cut.

One method of providing bridge labels according to the second embodiment shown in FIG. 6, is to laminate strips of transfer tape or double coated adhesive tape (i.e., non-limiting examples of adhesive strips 23) on the non-adhesive backing layer 50 which adheres well on splicing tape 140. However, the invention is not limited in this respect, and instead stripe coating of adhesive can be applied on the non-adhesive backing layer 50 as the adhesive strips 23.

Figure 7:
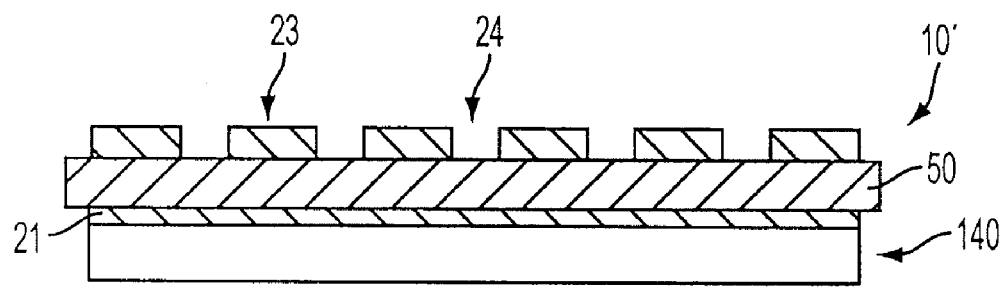
FIG. 7 shows a sectional view of the second embodiment of the bridge label adhered to an adhesive layer of a splicing tape.

As shown in FIG. 7, the backing 50 is applied to a layer of adhesive 21 of the splicing tape 140. It is noted that both the adhesive strips 23 and adhesive layer 21 of the splicing tape 140 can be covered with a release liner before the bridge label is used.

An application of the bridge label 10 in accordance with the first embodiment of the invention is described below.

Figure 9:
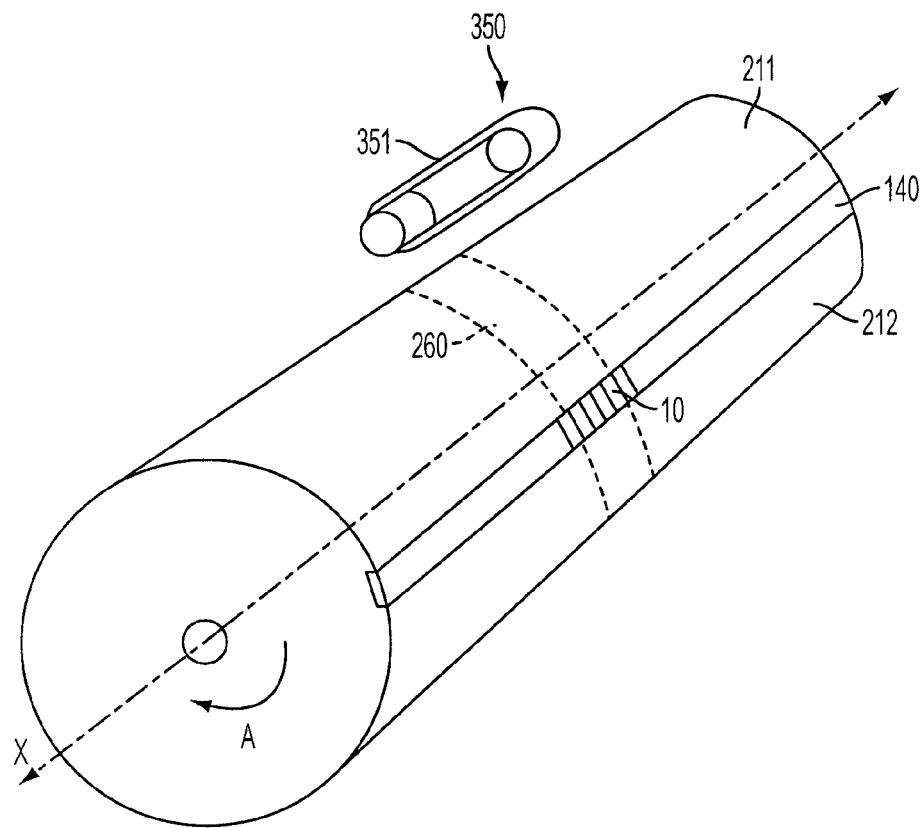
FIG. 9 is a perspective view of a new roll having a splicing tape and the bridge label of the invention.

During a splicing operation, first, if the bridge label 10 has a release liner 40, then release liner 40 of the bridge label 10 is removed from the adhesive layer 20. Next, the second face 25 of the bridge label 10 is affixed to a splicing tape 140 that is attached across the top sheet 211 of a new roll as shown in FIG. 9. The bridge label 10 is placed on the splicing tape 140 in a position such that the front end 32 and back end 34 of the bridge label extend in a direction substantially parallel to the splicing tape's 140 length across the top sheet 211 of the new roll 210. Stated otherwise, the bridge label 10 is positioned on the splicing tape 140 such that non-adhesive strips 30 (or conduits) extend in the circumferential direction of the new roll 210. With this arrangement, the non-adhesive strips 30 are effectively parallel to the running direction "B" of the expiring web sheet 220.

Figure 10:
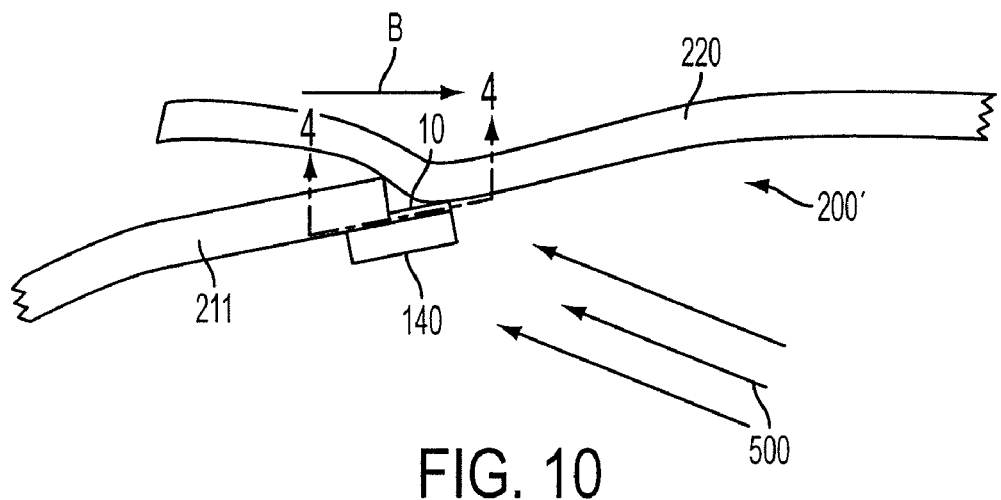
FIG. 10 shows a side view of the first embodiment of the bridge label applied to a splicing tape.

When the new roll 210 is accelerated to the speed of the expiring, running web sheet 220, the splicing tape 140 on the top sheet 211 of the new roll 210 is brought into contact with the expiring web sheet 220. When the splicing tape 140 contacts the expiring web sheet 220, the expiring web sheet 220 adheres to the splicing tape 140 and the adhesive portions 22 of the first face 24 of the bridge label 10 on the top sheet 211 of the new roll 210, causing the top sheet 211 to be spliced to the depleting web sheet 220 and resulting in the spliced web 200. Accordingly, as shown in FIG. 10, the adhesive portions 22 of the bridge label are affixed to the expiring web sheet 220 on the spliced web 200'.

Next, the spliced web 200' is subject to a printing operation. After the printing operation, the spliced web 200', including the splicing tape 140 and bridge label 10, is sent through a dryer, such as an air flotation dryer. However, as shown in FIG. 11, in the present operation, unlike conventional bridge labels, the non-adhesive strips 30 act as conduits, allowing the high temperature air 500 to flow through of the bridge label 10 (i.e., between the non-adhesive strips 30 and opposing particles of the spliced web) without turbulence. As such, the bridge label 10 does not act as an air dam in the manner of the prior art bridge label, and the temperature of the adhesive layer 20 is prevented from reaching its melting point.

In addition, the fact that the adhesive portions 22 are adhered to the expiring web by continuous bonded lines that extend in the direction of the blowing air to provide an improved contact surface that resists the peeling of the bridge label from the expiring web by the air.

The application of the second embodiment is similar to the application of the first embodiment. However, as is discussed above, one notable difference is that the non-adhesive backing layer 50 of the second embodiment is adhered to the splicing tape 140 by the adhesion of the adhesive 21 provided on the top of the splicing tape 140.

It is of course understood that departures can be made from the preferred embodiment of the invention by those of ordinary skill in the art without departing from the spirit and scope of the invention that is limited only by the following claims.

What is claimed is:

1. A bridge label, comprising:
   two adhesive portions, the adhesive portions defining a first face of the bridge label; and
   a non-adhesive portion extending between the two adhesive portions, the non-adhesive portion also defining the first face of the bridge label,
   wherein the adhesive portions are formed from an adhesive layer and the non-adhesive portion is a non-adhesive strip that extends substantially across the adhesive layer from a front end of the bridge label to a back end of the bridge label, such that part of the adhesive layer remains exposed on each side of the non-adhesive portion,
   wherein the non-adhesive strip is a paper or film,
   wherein said adhesive portions have notably more length than width,
   wherein said non-adhesive portion together with a web, to which the first face of said bridge label is affixed, define a conduit that allows air that passes across the bridge label to pass unobstructed when the bridge label is affixed to the web, and
   wherein a width of said non-adhesive portion at the front end of the bridge label is less than a width of said non-adhesive portion at the back end of the bridge label, such that said non-adhesive portion tapers from the back end of the bridge label to the front end.

2. The bridge label of claim 1, wherein the two adhesive portions extend substantially across the bridge label from the front end of the bridge label to the back end of the bridge label.

3. The bridge label of claim 1, wherein said non-adhesive portion is a plurality of non-adhesive portions.

4. The bridge label of claim 1, wherein said non-adhesive portion has a substantially trapezoidal shape.

5. The bridge label of claim 1, further comprising additional adhesive portions defining said first face and a plurality of non-adhesive portions also defining said first face,
   wherein said adhesive portions and non-adhesive portions are alternately arranged and parallel to one another.

6. A splicing system, comprising:
   a bridge label, including
      two adhesive portions, the adhesive portions defining a first face of the bridge label; and
      a non-adhesive portion extending between the two adhesive portions, the non-adhesive portion also defining the first face of the bridge label;
      wherein said adhesive portions have notably more length than width; a roll having a top sheet;
   a splicing tape provided across the top sheet of the roll, wherein a second face of the bridge label, which opposes the first face, is affixed to the splicing tape; and
   an expiring web, wherein the adhesive portions of the first face of the bridge label are affixed to the web.

7. The splicing system of claim 6, wherein the front end and the back end of the adhesive portions extend in a direction substantially parallel to an axis of rotation of the roll, so that the adhesive portions and the non-adhesive portion extend in direction orthogonal to the axis of rotation of the roll.

8. The splicing system of claim 7, wherein the non-adhesive portion and to web, to which the first face of said bridge label is affixed, define a conduit that allows air that passes across the bridge label to pass unobstructed when the bridge label is affixed to the web.

9. The splicing system of claim 6, wherein the bridge label covers an exposed portion of the splicing tape.

10. The splicing system of claim 6, further comprising a belt for accelerating the roll, wherein a length of the bridge label in a direction parallel to an axis of rotation of the roll is greater than a width of the belt in a direction parallel to an axis of rotation of the roll, so that the belt does not directly contact the splicing tape.

11. The splicing system of claim 6, wherein the adhesive portions are formed from an adhesive layer and the non-adhesive portion is a non-adhesive strip that extends substantially across the adhesive layer from the front end of the bridge label to the back end of the bridge label, such that part of the adhesive layer remains exposed on each side of the non-adhesive portion.

12. The splicing system of claim 6, wherein the adhesive portions are formed from an adhesive layer and the non-adhesive portion is a detackified strip of the adhesive layer that extends substantially across the adhesive layer from the front end of the bridge label to the back end of the bridge label, such that part of the adhesive layer remains on each side of the detackified strip.

13. The splicing system of claim 6, wherein the adhesive portions are formed from two adhesive strips formed on a non-adhesive backing, and non-adhesive portion is an uncovered portion of the backing layer positioned between the two adhesive strips.

14. The splicing system of claim 6, wherein said bridge label further includes additional adhesive portions defining said first face and a plurality of non-adhesive portions also defining said first face,
   wherein said adhesive portions and non-adhesive portions are alternately arranged and parallel to one another.

15. A method of splicing a new roll to an expiring web, comprising the steps of:
   providing a splicing tape on a top sheet of a roll;
   applying a bridge label to a top of said splicing tape, the bridge label including two adhesive portions, the adhesive portions defining a first face of the bridge label; and a non-adhesive portion extending between the two adhesive portions, the non-adhesive portion also defining the first face of the bridge label, wherein a second face of the bridge label, which opposes the first face, is applied to said splicing tape.

16. The method of claim 15, wherein said adhesive portions have notably more length than width.

17. The method of claim 16, wherein the front end and the back end of the adhesive portions extend in a direction substantially parallel to an axis of rotation of the roll, so that the adhesive portions and the non-adhesive portion extend in direction orthogonal to the axis of rotation of the roll.

18. The method of claim 16, Wherein the non-adhesive portion, together with the web, form a conduit through which air passes when the bridge label is affixed to the splicing tape.

19. The method of claim 16, wherein the bridge label covers an exposed portion of the splicing tape.

20. The method of claim 16, further comprising the step of accelerating the roll using a belt that contacts said bridge label, wherein a length of the bridge label in a direction parallel to an axis of rotation of the roll is greater than a width of the belt in a direction parallel to an axis of rotation of the roll, so that the belt does not directly contact the splicing tape.

21. The method of claim 16, wherein said bridge label further includes additional adhesive portions defining said first face and a plurality of non-adhesive portions also defining said first face, wherein said adhesive portions and non-adhesive portions are alternately arranged and parallel to one another.

22. The method of claim 15, further comprising affixing said adhesive portions of said first face of said bridge label to said expiring web.

* * * * *